Oct. 20, 1953     J. A. DODD     2,655,931
LOW-PRESSURE CUTOFF FOR HYDROPNEUMATIC TANKS
Filed May 21, 1948
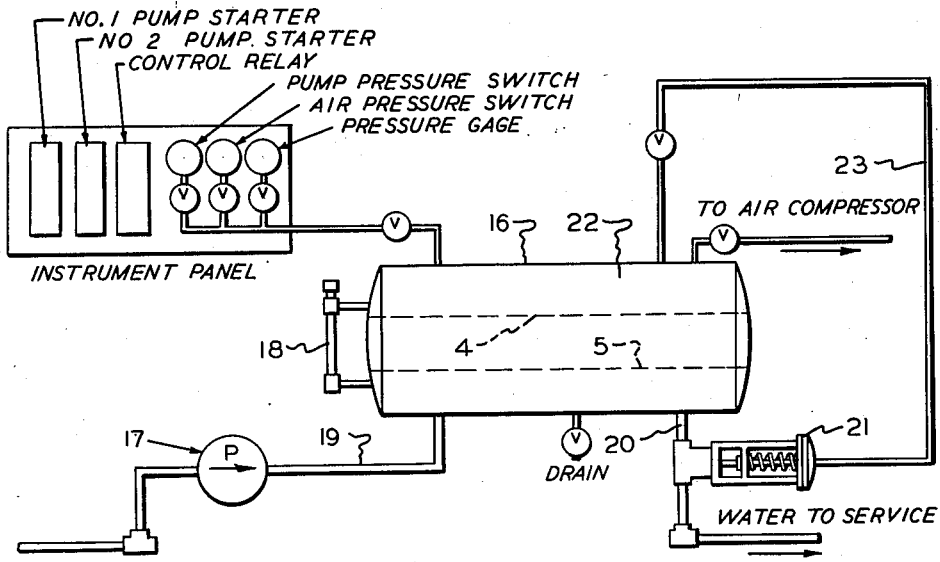
FIG. IV.
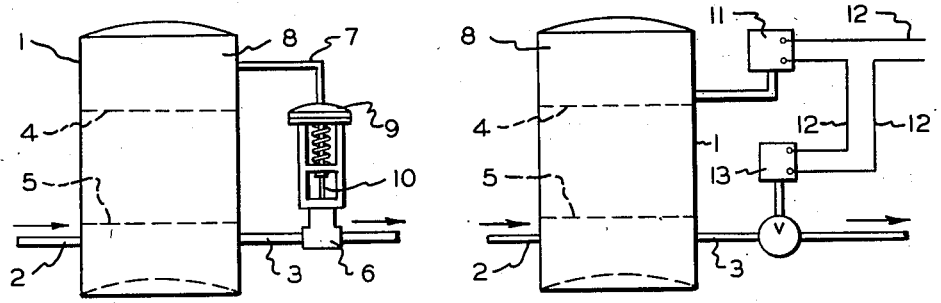
FIG. I.     FIG. II.
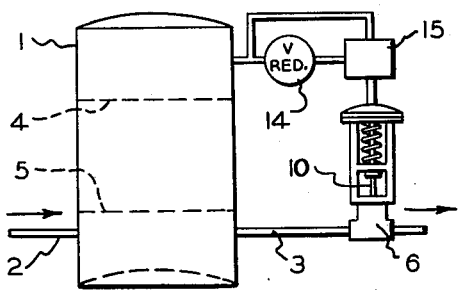
FIG. III.
Inventor
JOHN A. DODD
By Beaman & Patch
ATTORNEYS Patented Oct. 20, 1953

2,655,931

UNITED STATES PATENT OFFICE 2,655,931

LOW-PRESSURE CUTOFF FOR HYDRO-PNEUMATIC TANKS

John A. Dodd, Atlanta, Ga.

Application May 21, 1948, Serial No. 28,507

1 Claim. (Cl. 137—206)

1

This invention relates to hydro-pneumatic tank installations or systems as employed for booster service but more commonly for domestic water systems and which involve the use of a storage tank for holding a supply of the water or other liquid under pressure and also a body of air or gas enclosed in the tank space above the liquid therein.

In connection with hydro-pneumatic tank installations in which the tank pressure is liable to be higher than the static discharge pressure when the liquid level is at, or below, the liquid discharge connection from the tank, the objection exists that it is possible to lose air or gas from the tank. This objectionable condition exists with practically all hydro-pneumatic tank installations, whether used for booster service or for domestic water systems, and is particularly objectionable in the case of domestic or other pressure type water or liquid systems which rely upon the use of pumps which lose their prime if and when the tank is empty.

An object of the invention is to provide a hydro-pneumatic tank installation which is free from the above mentioned defect of the existing such installations.

It is thus an object of the invention to provide a hydro-pneumatic tank installation or system having a low pressure cut-off associated with the liquid discharge from the tank to avoid emptying of the tank and loss of air or gas from the tank when the liquid pressure or level drops below a predetermined minimum value or level.

It is also an object of the invention to provide a hydro-pneumatic tank having a liquid discharge pipe with a valve operatively associated therewith and adapted to cut-off the liquid discharge upon the tank pressure attaining a predetermined minimum value, whereby to prevent loss of air from the tank or to prevent the latter from emptying.

A further object of the invention is to provide a hydro-pneumatic tank as mentioned in the preceding paragraph wherein the said valve is arranged to be held open by the normal air pressure in the top of the tank and remains fully open during the normal operation of the booster or water system. That is to say, the valve employed has no throttling action in normal operation.

These and other objects and advantages residing in the arrangement and combination of parts will be clear from a consideration of the following description in conjunction with the accompanying drawings in which:

Fig. I is a diagrammatic showing of one arrangement of a hydro-pneumatic tank installation or system in accordance with the invention employing a reverse-acting diaphragm motor valve associated with the liquid discharge outlet from the tank and influenced by the tank air pressure, Fig. II is a diagrammatic showing of an alternative arrangement employing an electric switch actuated by the tank air pressure and operating an electric solenoid valve for controlling the liquid discharge from the tank, Fig. III is a diagrammatic showing of a modification of the arrangement according to Fig. I but with the addition of an air pressure reducing valve and an air pressure control unit for use with high pressure hydro-pneumatic tank installations where the tank pressure is too high to permit the employment of a conventional diaphragm motor valve, and Fig. IV is a diagrammatic showing of a typical hydro-pneumatic booster system with the invention applied thereto.

Referring to Figures I, II and III of the drawings, 1 indicates a hydro-pneumatic tank provided with an inlet pipe 2 connected to the discharge side of a pump (not shown) and an outlet pipe 3. The tank serves to store and deliver liquid under a pressure, the liquid being usually, but not necessarily water. The liquid in the tank reaches a normal level, denoted at 4, corresponding to the normal pressure condition, and a minimum level, denoted at 5, corresponding to the minimum pressure condition.

In the arrangement according to Figure I the liquid discharge pipe 3 is fitted with a control flow valve, indicated generally at 6, which valve is coupled by the pipe 7 to the tank air pressure space 8 so as to be influenced by the prevailing air pressure, whereby the valve will automatically close to cut-off the liquid discharge flow in the event of the air pressure corresponding to the pressure attained when the water level falls to the minimum level 5. In other words, the arrangement operates to prevent air from leaving the tank through the discharge pipe 3 in the event of the water level, and consequently the pressure, falling to that which corresponds with the minimum level 5.

The valve 6 may take a number of forms, which will suggest themselves to those skilled in the art having regard to the operational requirements mentioned, but a standard diaphragm type valve, known as a McAlear motor valve—type M—1235–R (reverse acting) but modified as to the sealing of the valve plug from the bottom instead of the top, has been successfully employed in the practicing of the invention. Such type of valve, and which forms no part of my invention per se, is indicated diagrammatically in Figure I, with its diaphragm chamber denoted by the references 9 and its valve spindle denoted by the reference 10, the valve spindle incorporating a coil spring, the pressure of which is overcome by the air pressure normally operating against the diaphragm so as to permit the valve normally to remain fully open.

The air in the tank space 8 therefore constitutes an operating medium for the motor valve 6 to permit the latter to close the liquid discharge outlet 3 when the air pressure diaphragm falls to a predetermined value, which corresponds to the minimum water level 5, while permitting the valve to remain open at higher pressures.

In Figure II the tank 1 is shown fitted with an electric pressure switch 11 connected by the pipe 12 with the tank air space 8 so as to be influenced by the prevailing air pressure, the electric pressure switch 11 being in turn electrically coupled by the lead lines 14 with a suitable source of electrical energy and with an electric solenoid valve, indicated generally at 13, and associated with the tank liquid outlet 3 to constitute the required low-pressure cut-off valve.

With this arrangement it is possible to use a reverse acting pressure switch 11 and a normally closed valve 13, or a direct acting pressure switch 11 and a reverse acting or normally open valve 13.

Figure III shows an arrangement similar to Figure I, with the equivalent parts denoted by the same reference numerals, but with the addition of an air pressure reducing valve 14 and an air pressure control unit 15, to suit high pressure installations where the tank pressure is too high for the conventional diaphragm motor valve 6. In this case the air for operating the valve may be taken direct from the tank or from an outside source.

Referring now to Figure IV, this shows the principles of the invention applied to an automatic booster pump system with the water-air pressure tank indicated at 16, the usual pressure pumps at 17, and the minimum tank liquid level at 5 and the normal level at 4 to correspond with the previously described embodiments. This booster pump system is shown as incorporating an electrode containing tube assembly and arrangement indicated generally at 18 operating, as disclosed in my prior U. S. patent specification No. 2,318,066, to control the liquid level 4.

The pumps 17 deliver the pressure liquid to the tank 16 via the pipe 19. The liquid discharge takes place through the pipe 20 and the latter incorporates a reverse acting diaphragm motor valve indicated generally at 21, operating as and for the purpose described with reference to the previous embodiments and connected to the tank air space 22 by the pipe 23.

It will be appreciated, from consideration of the above description in conjunction with the drawings, that I have provided a hydro-pneumatic tank installation from which the loss of air is automatically prevented should the tank pressure fall to a predetermined low value. In other words, I provide a low pressure cut-off arrangement to prevent loss of air from the tank through the liquid discharge outlet when such a low pressure and liquid level prevails.

While my invention finds particular use in connection with pressure water systems and water booster systems employing hydro-pneumatic tanks, and compensates for power failure when an electrically operated pump is employed or in case the tank discharge rate exceeds the pump capacity, it is also capable of wider application to systems using a closed vessel or tank containing a liquid and a gas and using the gas as a cushion to maintain pressure within the desired limits of the liquid system.

Having thus described my invention in principle and in several practical applications, what I claim as novel and as constituting the scope of the required patent protection is as follows:

A hydro-pneumatic system comprising a closed tank of known volume containing a varying supply of liquid and a relatively constant known supply of compressed gas above the liquid and forming an elastic cushion, a liquid inlet for admitting liquid under pressure to raise the liquid level in said tank to further compress said gas to increase the pressure thereof, a liquid outlet connection to said tank at a point dividing the tank into known volumes above and below said outlet for withdrawing liquid from said tank to lower said liquid level to expand said gas in said tank to reduce the pressure thereof, a valve in said liquid outlet for regulating the flow of liquid from said tank to lower said level, means for actuating said valve including means connected to said tank and responsive to the pressure of said gas to close said valve and to interrupt the withdrawal of liquid from said tank upon a predetermined minimum pressure in said tank, said gas supply having a predetermined volume at said predetermined minimum pressure in said tank establishing said liquid level above said outlet whereby loss of said gas supply through said outlet is avoided by closing said valve with said liquid level above said outlet.

JOHN A. DODD.

References Cited in the file of this patent
UNITED STATES PATENTS

| Number | Name | Date |
|---|---|---|
| 1,268,597 | Montreuil | June 4, 1918 |
| 2,153,213 | Thomas | Apr. 4, 1939 |
| 2,196,453 | Horvath | Apr. 9, 1940 |
| 2,416,345 | Piccardo | Feb. 25, 1947 |